(12) United States Patent
Norman

(10) Patent No.: US 7,436,907 B1
(45) Date of Patent: Oct. 14, 2008

(54) ANALOG COMPRESSION OF GPS C/A SIGNAL TO AUDIO BANDWIDTH

(75) Inventor: Charles P. Norman, Huntington Beach, CA (US)

(73) Assignee: SiRF Technology, Inc., San Jose, CA (US)

( * ) Notice: Subject to any disclaimer, the term of this patent is extended or adjusted under 35 U.S.C. 154(b) by 577 days.

(21) Appl. No.: 09/938,387

(22) Filed: Aug. 23, 2001

Related U.S. Application Data

(60) Provisional application No. 60/227,671, filed on Aug. 24, 2000.

(51) Int. Cl.
 *H04L 27/14* (2006.01)
 *H04L 27/16* (2006.01)
 *H04L 27/22* (2006.01)

(52) U.S. Cl. .................. 375/324; 375/316; 342/352; 342/357.06

(58) Field of Classification Search .................. 375/316, 375/324–326, 340; 342/352, 357.06
See application file for complete search history.

(56) References Cited

U.S. PATENT DOCUMENTS

| | | | |
|---|---|---|---|
| 4,797,677 A * | 1/1989 | MacDoran et al. .......... 342/352 |
| 5,241,561 A * | 8/1993 | Barnard ...................... 375/147 |
| 5,517,529 A | 5/1996 | Stehlik |
| 5,663,734 A | 9/1997 | Krasner |
| 5,663,735 A | 9/1997 | Eshenbach |
| 5,757,916 A | 5/1998 | MacDoran et al. |
| 5,781,156 A | 7/1998 | Krasner |
| 5,812,087 A | 9/1998 | Krasner |
| 5,825,327 A | 10/1998 | Krasner |
| 5,831,574 A | 11/1998 | Krasner |
| 5,841,396 A | 11/1998 | Krasner |
| 5,874,914 A | 2/1999 | Krasner |
| 5,884,214 A | 3/1999 | Krasner |
| 5,945,944 A | 8/1999 | Krasner |
| 5,999,124 A | 12/1999 | Sheynblat |
| 6,002,363 A | 12/1999 | Krasner |
| 6,016,119 A | 1/2000 | Krasner |
| 6,052,081 A | 4/2000 | Krasner |
| 6,061,018 A | 5/2000 | Sheynblat |
| 6,064,336 A | 5/2000 | Krasner |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |

(Continued)

OTHER PUBLICATIONS

Marketing Material: Qualcomm CDMA Technologies - Integrated Solutions - MGP6200™Multimode GPS Processor (8 pages), year 2002.

(Continued)

*Primary Examiner*—Phuong Phu
(74) *Attorney, Agent, or Firm*—The Eclipse Group LLP

(57) ABSTRACT

The present invention discloses analog methods and circuits for compression of the GPS C/A signal to audio bandwidths to improve TTFF times, as well as decreasing auto correlation errors in systems that employ the methods and devices disclosed.

10 Claims, 9 Drawing Sheets

U.S. PATENT DOCUMENTS

| | | |
|---|---|---|
| 6,185,427 B1 | 2/2001 | Krasner |
| 6,208,290 B1 | 3/2001 | Krasner |
| 6,208,291 B1 | 3/2001 | Krasner |
| 6,215,441 B1 | 4/2001 | Moeglein |
| 6,215,442 B1 | 4/2001 | Sheynblat |
| 6,236,354 B1 | 5/2001 | Krasner |
| 6,239,742 B1 | 5/2001 | Krasner |
| 6,259,399 B1 | 7/2001 | Krasner |
| 6,272,430 B1 | 8/2001 | Krasner |
| 6,289,041 B1 | 9/2001 | Krasner |
| 6,307,504 B1 | 10/2001 | Sheynblat |
| 6,313,786 B1 | 11/2001 | Sheynblat |
| 6,314,308 B1 | 11/2001 | Sheynblat |
| 6,377,209 B1 | 4/2002 | Krasner |
| 6,408,196 B2 | 6/2002 | Sheynblat |
| 6,411,254 B1 | 6/2002 | Moeglein |
| 6,411,892 B1 | 6/2002 | Van Diggelen |
| 6,417,801 B1 | 7/2002 | Van Diggelen |
| 6,421,002 B2 | 7/2002 | Krasner |
| 6,429,814 B1 | 8/2002 | Van Diggelen et al. |
| 6,433,731 B1 | 8/2002 | Sheynblat |
| 6,453,237 B1 | 9/2002 | Fuchs et al. |
| 6,484,097 B2 | 11/2002 | Fuchs et al. |
| 6,487,499 B1 | 11/2002 | Fuchs et al. |
| 6,510,387 B2 | 1/2003 | Fuchs et al. |
| 6,542,821 B2 | 4/2003 | Krasner |
| 6,583,757 B2 | 6/2003 | Krasner |
| 6,597,311 B2 | 7/2003 | Sheynblat |

OTHER PUBLICATIONS

Marketing Material: uNav Microelectroncis - uN9x18 Low Power, High Performance GPS Receiver Chipset/uN9x18 GPS Receiver Solution (9 pages), year 2006.

Marketing Material: uNav Microelectronics, uN9x18 Low Power, High Performance GPS Receiver Chipset (2 pages), Jul. 21, 2006.

Marketing Material: Global Locate - Hammerhead II™, Single Chip AGPS Solution (2 pages), year 2007.

Marketing Material/Press Release: Broadcom Introduces Advanced Single-Chip GPS Solution for Mobile Applications (3 pages), dated Oct. 15, 2007.

Marketing Material/White Paper: SnapTrack: A Qualcomm Company - SnapTrack's Wireless Assisted GPS™(A-GPS) Solution Provides the Industry's Best location System - Location Technologies for GSM, GPRS and WCDMA Networks (Qualcomm CDMA Technologies: Enabling the Future of Communications) (4 pages), year 2003.

* cited by examiner

ANALOG COMPRESSION OF GPS C/A SIGNAL TO AUDIO BANDWIDTH

CROSS-REFERENCE TO RELATED APPLICATIONS

This application claims priority under 35 U.S.C. § 119(e) of U.S. Provisional Patent Application No. 60/227,671, filed Aug. 24, 2000, entitled "ANALOG COMPRESSION OF GPS C/A SIGNAL TO AUDIO BANDWIDTH," by Charles P. Norman, which application is incorporated by reference herein.

BACKGROUND OF THE INVENTION

1. Field of the Invention

The present invention relates in general to Global Positioning System (GPS) signals, and in particular to a method and apparatus for analog compression of GPS clear/acquisition (C/A) signals to audio bandwidths.

2. Description of the Related Art

Currently, there exists a position determining system, referred to as the NAVSTAR Global Positioning System (GPS), wherein a constellation of 24 orbiting satellites transmit pseudo-random ranging signals from which users with appropriate equipment can obtain three-dimensional location, velocity and timing information anywhere on or near the surface of the Earth. The longitude, latitude and altitude of any point close to Earth, with respect to the center of the Earth, will be calculated by determining propagation times of electromagnetic signals from one or more of the satellites to the point in question.

A signal about a single center frequency from one or more of the visible satellites will be received by a user terminal at a point close to Earth to measure propagation times of the electromagnetic signals transmitted by the satellites. The satellites from which the signals originate are identified by modulating the signal transmitted from each satellite with pseudo-random coded signals. The GPS System will operate in two simultaneous modes. In one mode, referred to as the clear/acquisition (C/A) mode, the pseudo-random noise (PN) signal is a Gold code sequence that is repeated once every millisecond to enable the position of the receiver responsive to the signals transmitted from one or more of the satellites to be determined to an accuracy better than 100 meters.

E911 requires capability to determine the location of a handset. The location information is required to be passed through a narrow band communication channel. A compressed C/A code can be sent over any cellular communications channel, enabling location of the handset by the receiver. Further, mobile devices require low power consumption, and with compressed messages, lower transmitter and receiver power is used.

It can be seen, then, that there is a need in the art for techniques to compress the C/A code. It can also be seen, then, that there is a need in the art for compressing the C/A code in order to use the C/A code with other remote GPS receiver components. It can also be seen that there is a need in the art to provide the compressed C/A code in a relatively inexpensive manner. It can also be seen that there is an need in the art for low power GPS receivers.

SUMMARY OF THE INVENTION

To minimize the limitations in the prior art, and to minimize other limitations that will become apparent upon reading and understanding the present specification, the present invention discloses a method and apparatus for using analog circuitry to compress the GPS C/A signal to an audio bandwidth.

A method for compressing a Global Positioning System (GPS) signal in accordance with the present invention comprises removing a carrier component of the GPS signal, matching a comb filter to the GPS signal to obtain a first output comprising filter lines, and frequency shifting the filter lines in the first output to produce a compressed GPS signal.

It is an object of the present invention to provide techniques to compress the C/A code. It is another object of the present invention to provide methods and devices to compress the C/A code in order to use the C/A code with other remote GPS receiver components. It is another object of the present invention to provide methods and devices to compress the C/A code in a relatively inexpensive manner. It is also an object of the present invention to provide low power GPS receivers.

BRIEF DESCRIPTION OF THE DRAWINGS

Referring now to the drawings in which like reference numbers represent corresponding parts throughout.

DETAILED DESCRIPTION OF THE DRAWINGS

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

Any periodic signal has a Fourier series consisting of frequencies that are integer multiples of the repetition frequency. The C/A code repeats every millisecond, thus the signal power is limited to frequencies that are integer multiples of 1 kHz.

The code is modulated onto the L1 carrier frequency. This signal is then received by the user and will have a Doppler shift. The receiver can remove the L1 carrier, leaving only the C/A code and Doppler. In order to filter out the noise between the 1 kHz frequencies an assist signal needs to be provided that places a satellite's Doppler at an integer multiple of 1 kHz. The periodicity of the C/A signal limits the bandwidth of this assist signal to 1 kHz.

The C/A code is modulated with telemetry data bits at a 50 Hz rate. To maintain the periodicity of the signal the telemetry data bits need to be removed from the signal. Modulating the previously described assist signal with the data bits will remove the data modulation. This increases the bandwidth of the assist signal to 1100 Hz.

The C/A code repeats 20 times for every telemetry data bit. This repetition places the signal power in spectral lines spaced 1 kHz apart. The signal can be compressed without any loss of signal by transforming these 20 repetitions to the frequency domain and zeroing the frequency bins that have no signal. The remaining bins can be transformed back to the time domain with the bandwidth reduced by a factor of 20. The compression is the same as the number of repetitions used. If the 50 Hz telemetry data bit transitions are removed then more than 20 repetitions may be used. The factor limiting the number of repetitions that can be used now becomes the user's motion. If the user motion is limited to 0.5 g acceleration then the bandwidth may be reduced by more than a factor of 100 without loss of signal.

Additional methods of bandwidth compression are possible but may result in signal loss. One method is to eliminate transmission of some of the spectral lines. Since the signal level in each line varies, it is possible to eliminate the lines with the least power to minimize the signal loss. Another method of bandwidth compression is to overlap the output bands. The portion of the output bands that overlap will have increased noise density, causing a reduction in signal to noise ratio. No loss occurs when each line is band limited such that the noise power in the band around each line doesn't overlap the next line's band.

Example System

Figure 1:
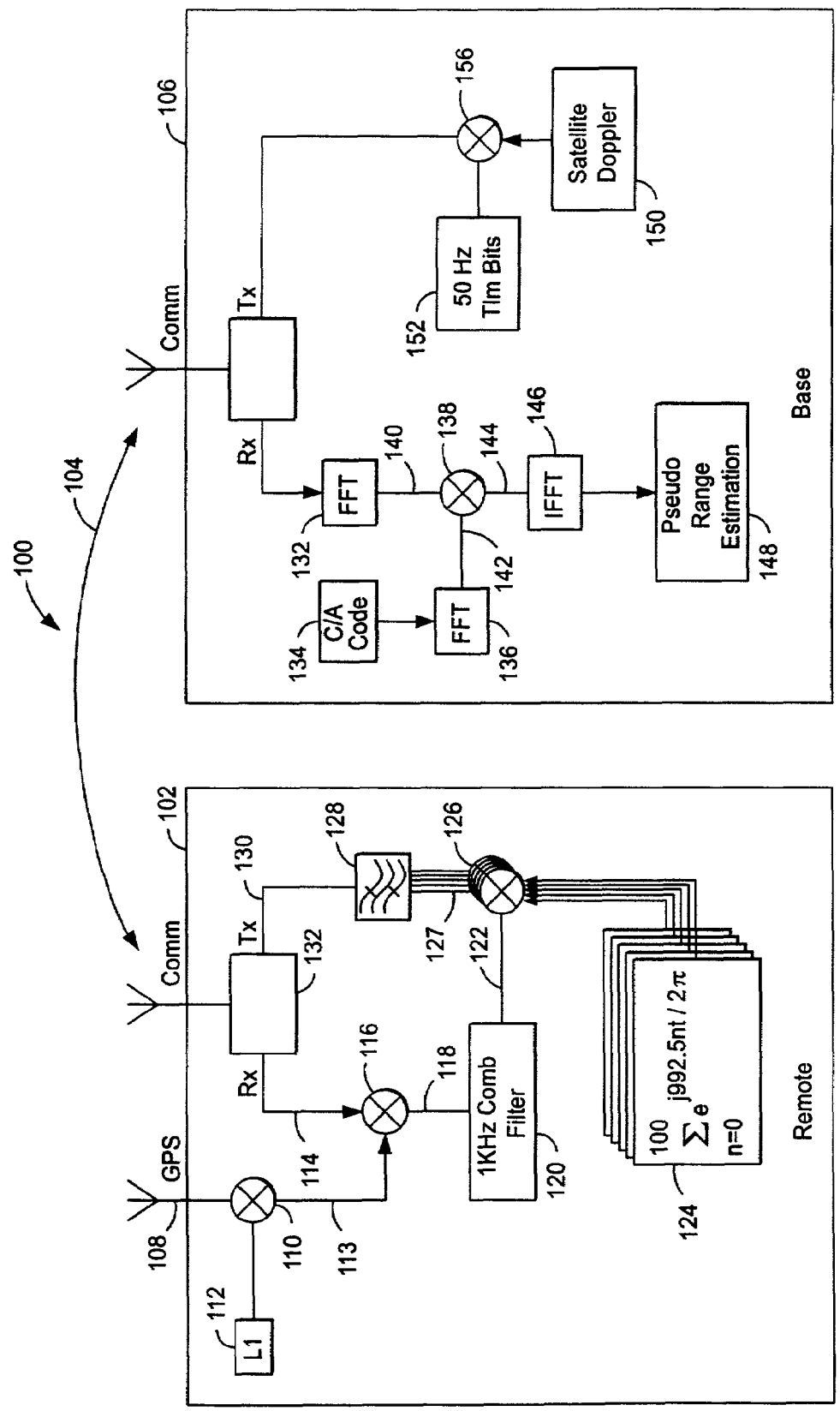
FIG. 1 illustrates a system in accordance with the present invention.

FIG. 1 illustrates a system in accordance with the present invention.

System 100 comprises a remote receiver 102 that has a radio link 104 to a base station 106. The radio link 104 can provide a common frequency reference to both remote receiver 102 and base station 106, so the system 100 will not be concerned with user clock offsets. The base station 106 can also provide an assist signal to remote receiver 102 via radio link 104 to remove telemetry data and Doppler due to satellite motion.

Remote receiver 102 comprises a GPS antenna 108 that is able to receive signals from GPS satellites. The GPS antenna 108 can be the same antenna or a different antenna than that used to provide radio link 104. GPS signals that are received at GPS antenna 108 are put through mixer 110, where they are mixed with L1 signal 112 to remove the L1 carrier. The resultant signal 113 contains the GPS data in a spread spectrum format. Signal 113 is then mixed with the receive signal 114 at mixer 116, and the resultant signal 118 is filtered in a 1 kHz comb filter 120.

The output 122 of comb filter 120 is mixed with outputs from frequency generators 124 at mixers 126. The outputs from mixers 126 are filtered through a bandpass filter signal combiner 128, and filtered output 130 is duplexed through duplexer 132 for transmission on radio link 104 to base station 106.

Operation of the Invention

FIGS. 2A-2H illustrate the operation of the invention.

In the remote unit 104 of the present invention, the bandwidth of signal that remote unit 104 must transmit from remote unit 104 to base station 106 is typically about 1 MHz when the signal is not compressed. The present invention reduces the bandwidth of the signal that needs to be transmitted to base station 106 by compressing the GPS signals to a bandwidth of less than 2 kHz.

Figure 2A:
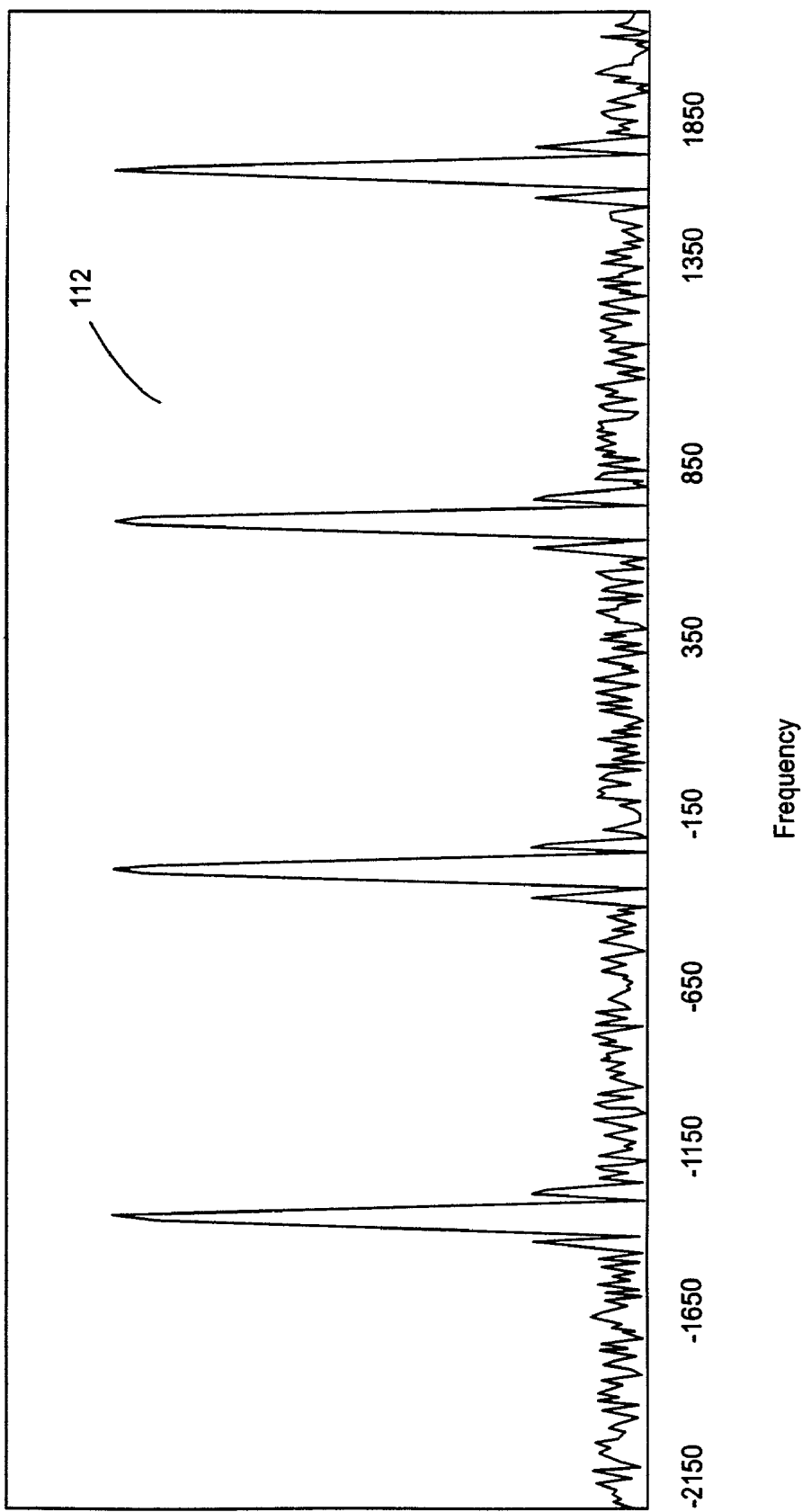
FIGS. 2A-2H illustrates the operation of the present invention.
Figure 2B:
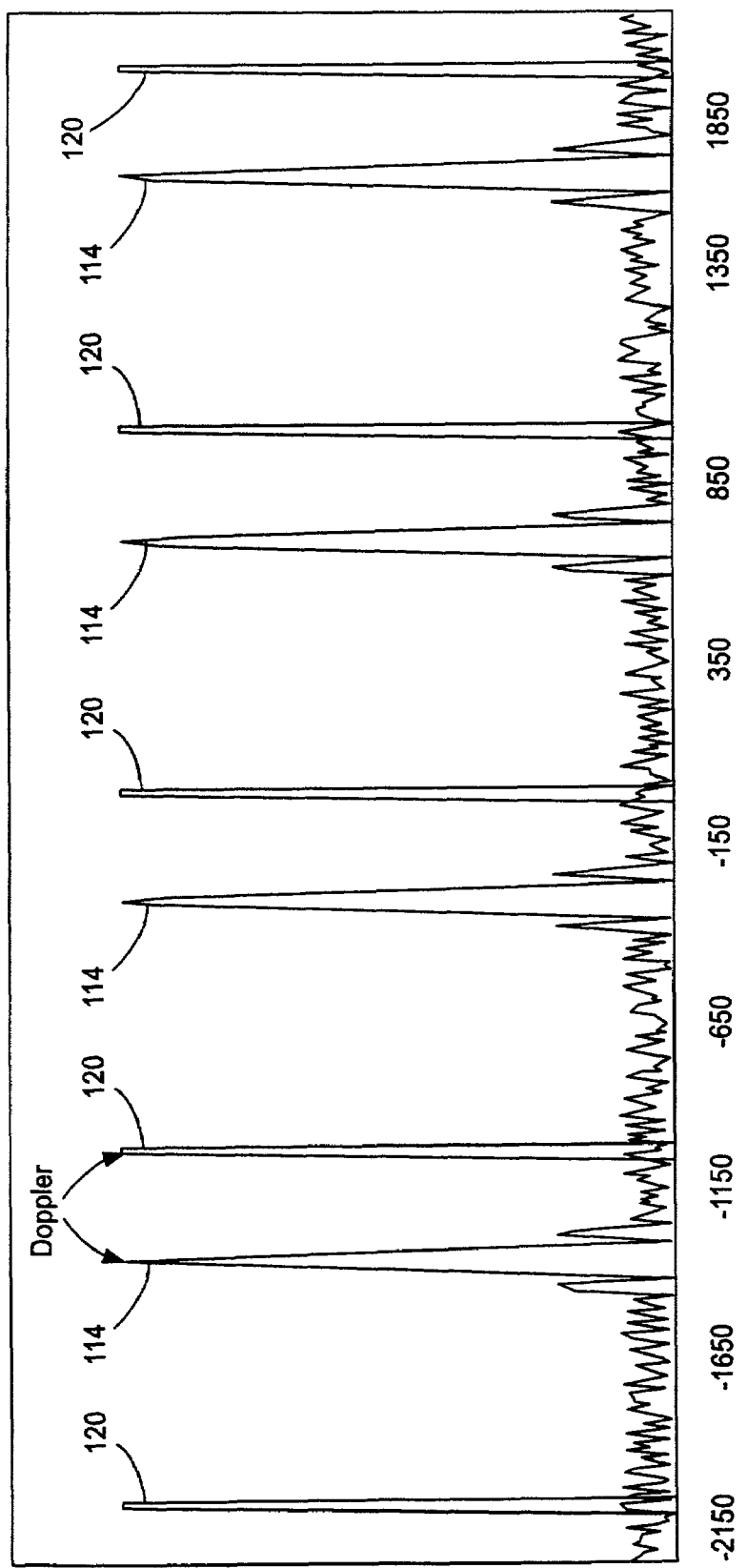
Figure 2C:
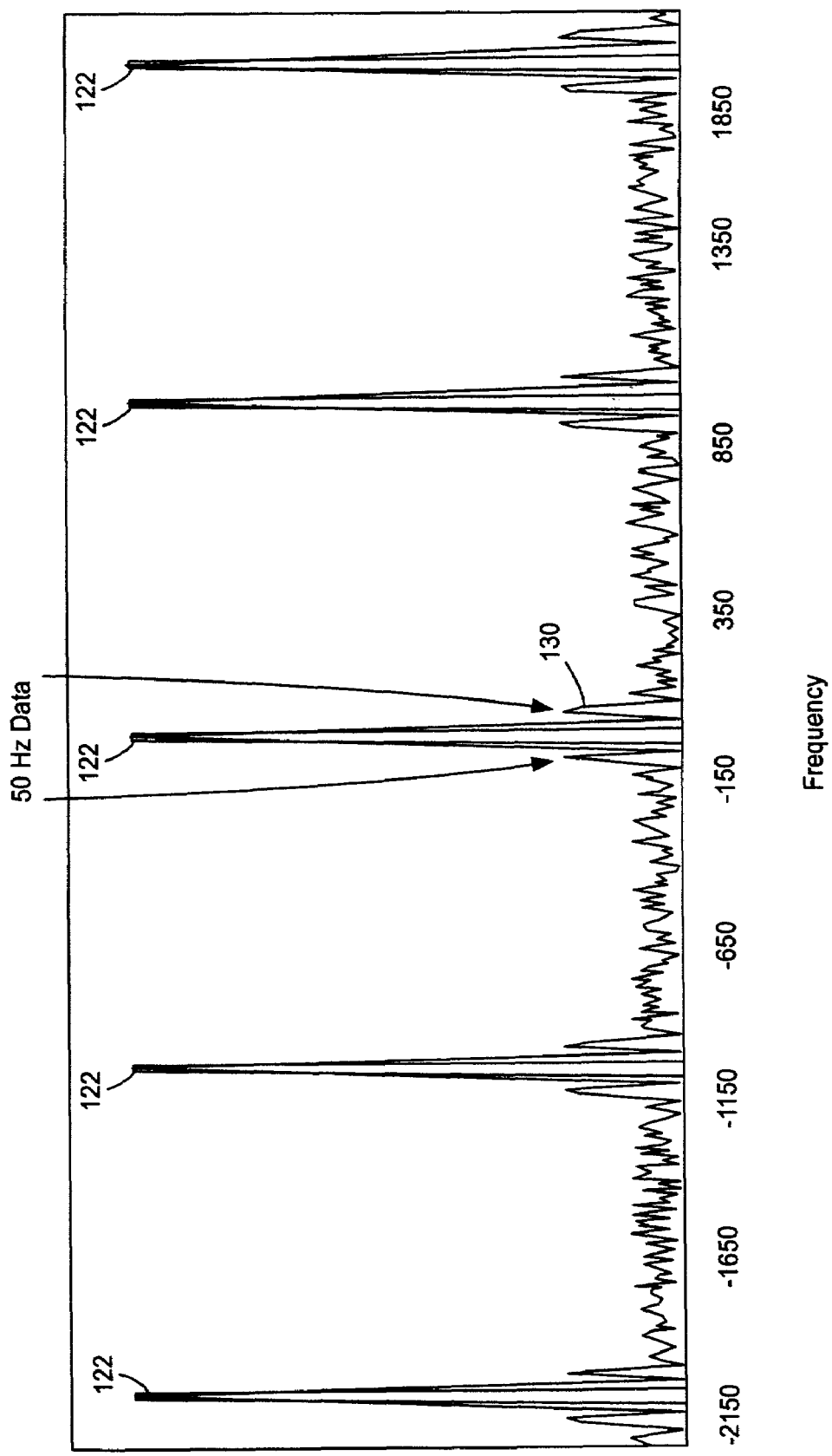
Figure 2D:
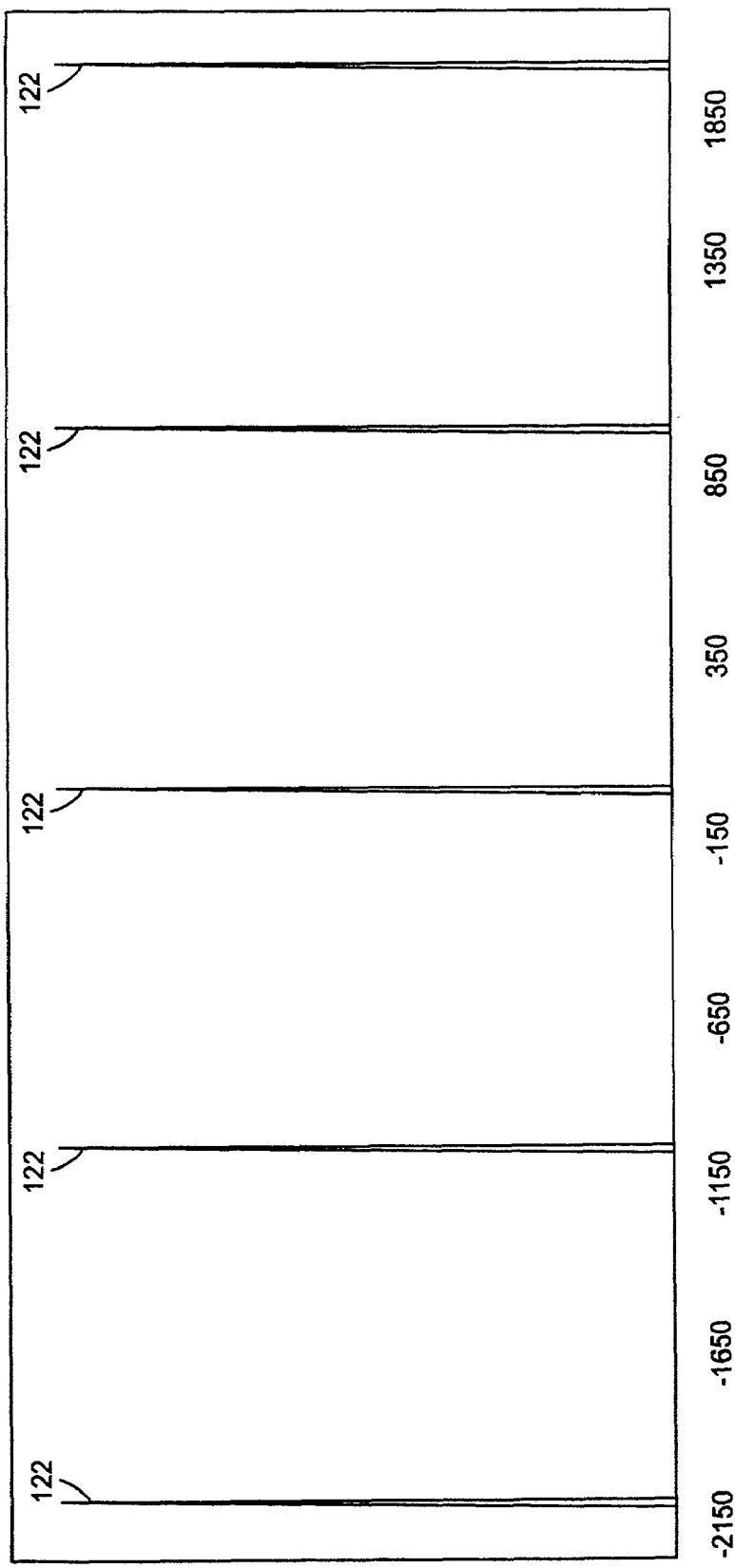

Spectrum 112, shown in FIG. 2A, is essentially noise with embedded GPS signals. Signal 114, shown in FIG. 2B, is used to shift comb filter 120 by a fraction of a kHz to line the comb filter up with expected signal peaks, or to adjust comb filter 120 to a new position to acquire and/or track a different satellite. The spectrum shown in FIG. 2C shows the spectrum after frequency shifting the signal to line up the signal spectral lines with the comb filter lines. 50 Hz data 130 is present in the signal. FIG. 2D shows signal 122 as a series of lines, which results from mixing signals 112 and 114, where the 50 Hz data has been removed by mixing with signal 114, which has matching bi-phase data, and passing the mixed signal through comb filter 120.

Figure 2E:
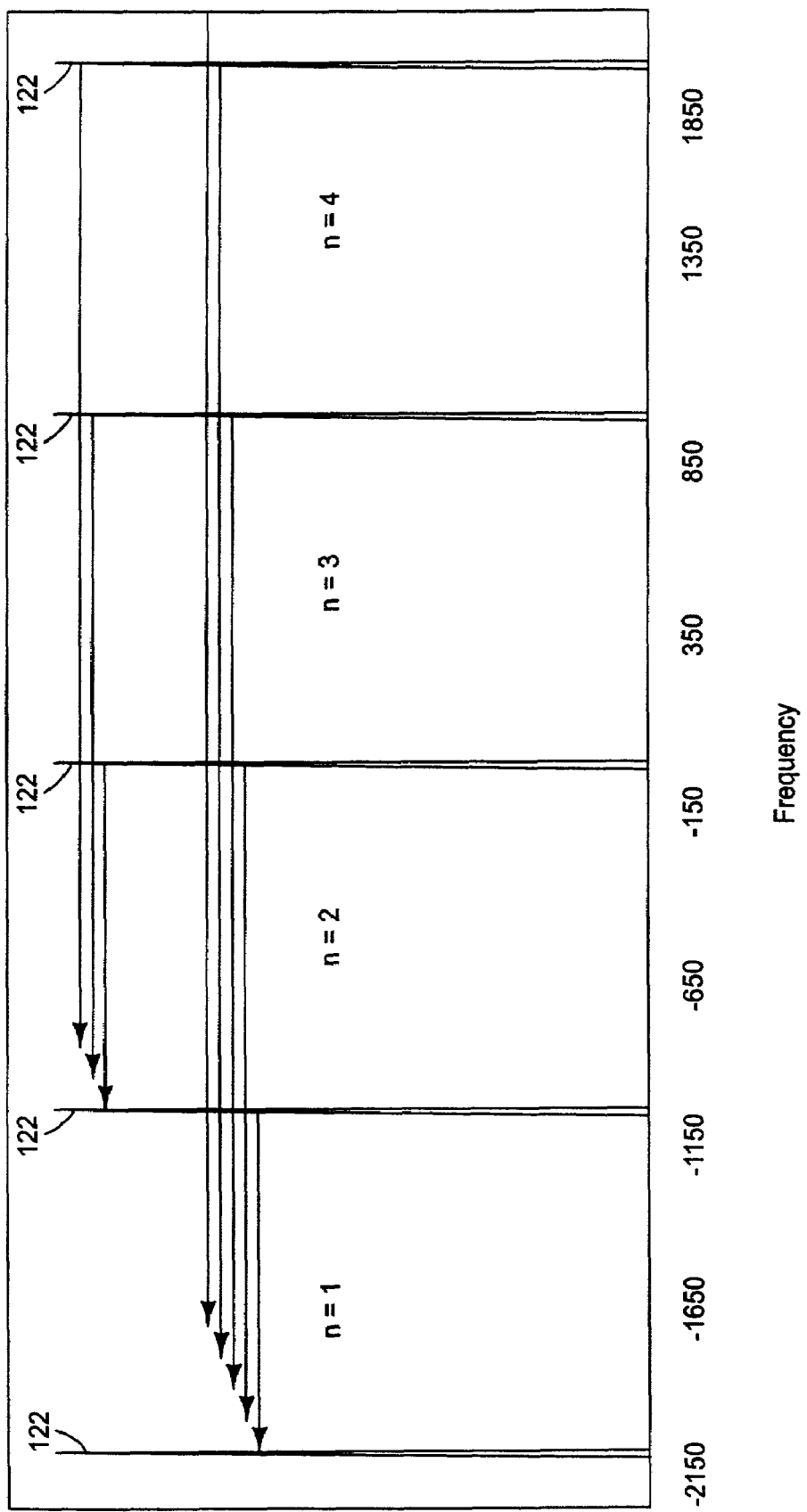
Figure 2F:
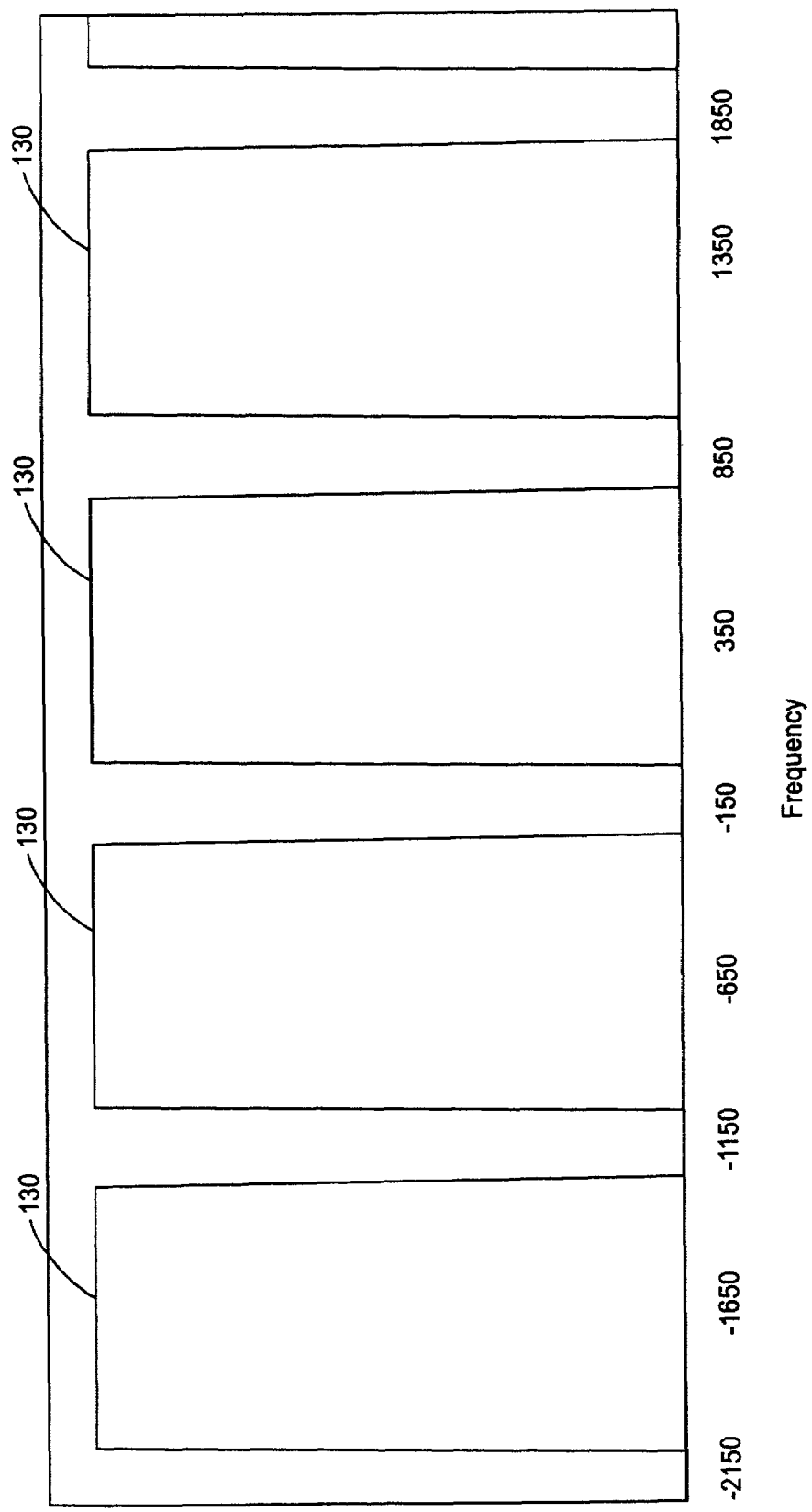
Figure 2G:
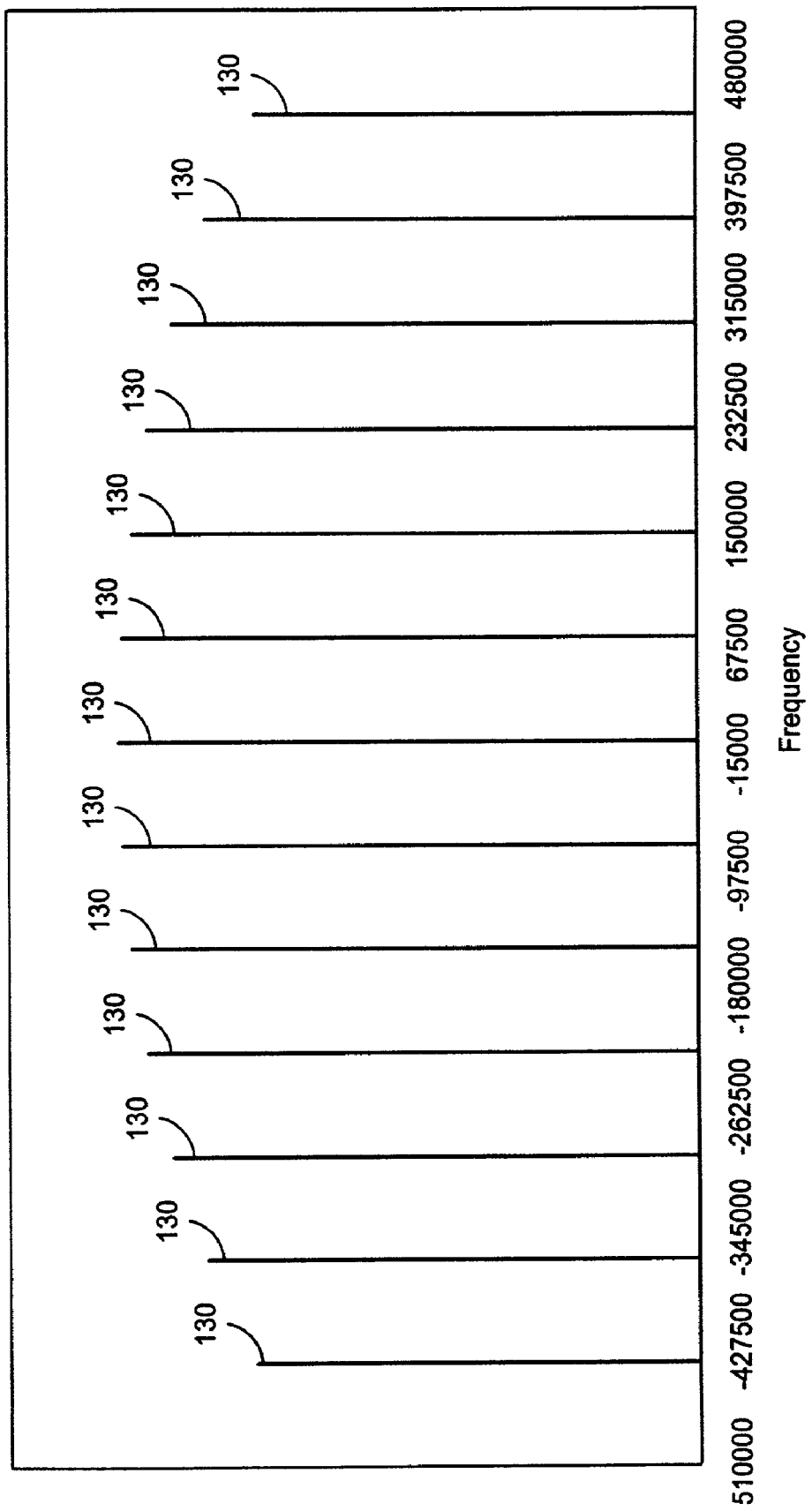

FIG. 2E shows the effect of mixing with frequency generators 124, which are typically generated by a single frequency generator that is passed through a separate comb filter. There are typically up to 100 outputs of the comb filter to generate up to 100 specific frequencies. The spectrum of the output shows the first stage of compression as shown in FIG. 2F. These are then bandpass filtered by filter 128 to remove correlated signals, and the output signal 130 of filter 128 is shown in FIG. 2G.

Figure 2H:
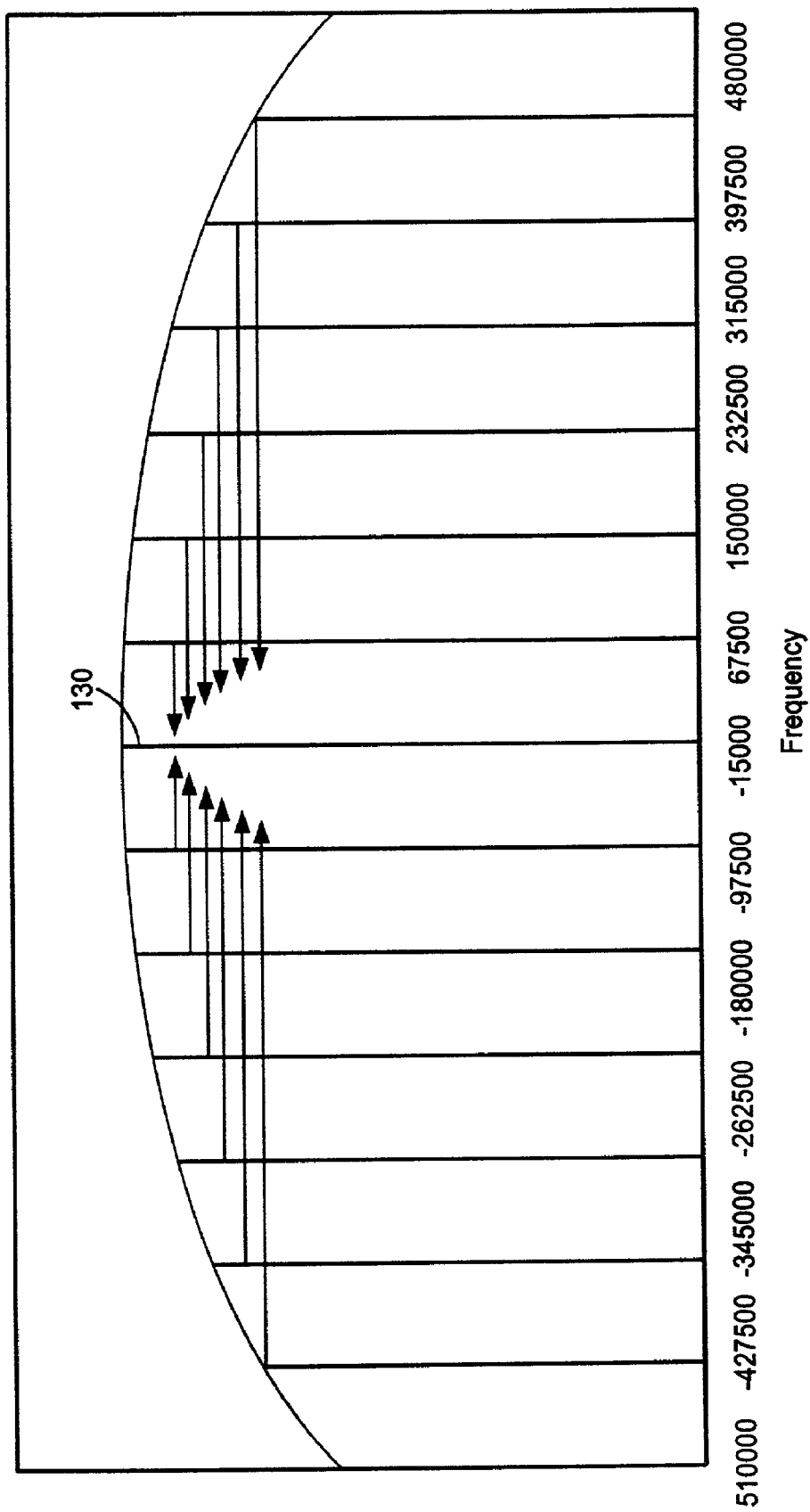

FIG. 2H shows the compression process repeated to give a final compression ratio of up to 100.

Signal 130 requires a smaller bandwidth, i.e., a smaller time of transmission, for transmission to base station 106. Because signal 130 contains all of the information present in the original GPS signal transmitted by the GPS satellite, the accuracy of any position determination done by base station 106 is just as accurate as any partial position calculation or full position calculation done by remote receiver 102.

Referring again to FIG. 1, base station 106 receives signal 130 via radio link 104, and performs a Fast Fourier Transform (FFT) 132. A local code generator 134 also has an FFT performed in block 136, and mixer 138 mixes the two signals 140 and 142. Resultant signal 144 then has an Inverse FFT performed in block 146, and pseudorange information is determined in block 148. Essentially, base station 106 acts as a GPS receiver and determines the position of remote receiver 102.

As described above, satellite Doppler 150 and telemetry bits 152 can be mixed in mixer 156 and transmitted to remote receiver 102 via radio link 104. Further, base station 106 can transmit the position of remote receiver 102 back to remote receiver 102 via radio link 104 for use by remote receiver 102 in location services, dead reckoning, E911 situations, or other areas or services where remote receiver 102 would need a position calculation.

The present invention reduces the complexity of the circuitry required at a remote receiver 102. There is no longer a "GPS receiver" located at remote receiver 102. Instead, there is an apparatus for removing the L1 carrier and circuitry for sending compressed GPS signals to a base station for calculation of a position of the remote receiver 102. The present invention thus allows remote receivers 102, such as cellular telephones, Personal Communications System (PCS) communication devices, Personal Data Assistant (PDA) devices, mobile computers, and other mobile devices to have a small, lightweight, low power addition and still have access to GPS positioning technology. Further, since the bandwidth of the signal 130 is so small, an identification (ID) signal can be attached to the signal 130 at the remote receiver, such as a Mobile Identification Number/Electronic Serial Number (MIN/ESN), such that the base station 106 can determine which remote receiver 102 the base station 106 is calculating a position for. Such data is useful for statistical purposes, as well as a fee-for-service purpose of the base station 106 or wireless carrier that is providing position calculation services as described by the present invention.

The present invention envisions that an all-analog remote device, which is compatible with the remainder of the GPS receiver and processing circuitry, can transform the C/A signal such that the C/A signal can be transmitted over any audio bandwidth communication link. The transformed C/A signal can then be processed, either locally or remotely, to obtain the location of the remote device. Further, the present invention envisions that an all-digital device can perform the same functions as described in the analog system presented herein.

Although the above system has been presented as an example, other systems are possible within the scope of the present invention that can be optimized for one or more design variables, e.g., low power, for the required output bandwidth, vehicle dynamics, sensitivity, or other design goals.

Simulation

A digital simulation was performed by creating a sequence of sampled C/A code plus noise. The compression was simplified by filtering and frequency shifting of the sample sequence as follows:

```
void filterUpdate(complexType sampleData,
    complexType filterData[ ],
    long rotationIndex,
    long sampleSize)
{
    long i;
    long thisIndex = 0;
    long rotationStep =   (rotationIndex * TABLE_SIZE /
                           sampleSize) % TABLE_SIZE;
#define alpha 1.0
#define beta 1.0
    for (i = 0; i < sampleSize; i++)
    {
        filterData[i] = complexSum(
    complexProduct(fromFloat(beta, 0.0),filterData[i]),
    complexProduct(fromFloat(alpha, 0.0),
    complexRotation(sampleData, thisIndex)));
        thisIndex -= rotationStep;
        if (thisIndex < 0)
            thisIndex += TABLE_SIZE;
    }
}
complexType Compress(complexType filterData[ ],
    long compression,
    long rotationIndex,
    long sampleSize)
{
    long i;
    long thisIndex = 0;
    long rotationStep = (rotationIndex * TABLE_SIZE /
        sampleSize) % TABLE_SIZE;
    complexType retval = complexZero;
    for (i = 0; i < sampleSize; i += compression)
    {
        retval = complexSum(retval,
                complexRotation(filterData[i], thisIndex));
        thisIndex += rotationStep;
        if (thisIndex >= TABLE_SIZE)
            thisIndex -= TABLE_SIZE;
    }
    retval.I / = sampleSize / compression;
    retval.Q / = sampleSize / compression;
    return retval;
}
Part of the main program to illustrate the present invention is:
for (i = 0; i < TABLE_SIZE; i++)
{
    filterUp date(signal[i],
                filterData,
                i,
                1023 * COMPRESSION_FACTOR);
    SigComp[i] = Compress(filterData,
                COMPRESSION_FACTOR,
                i,
                1023 * COMPRESSION_FACTOR);
}
```

There are several ways to process the compressed samples. The most efficient would be to sub sample at a sample rate that is twice the compressed bandwidth. The simulation sample rate was kept the same for simplicity. The compressed signal was transformed to the frequency domain and then decompressed by shifting the frequency bins with the following:

```
void deCompress(complexType compressFreq[ ], complexType deCompressFreq[ ],long compression, long sampleSize)
```

```
{
    long i;
    long thisIndex = 0;
    for (i = 0; i < sampleSize; i++)
    {
        if (i % compression)
            deCompressFreq[i] = complexZero;
        else
        {
            deCompressFreq[i] = compressFreq[thisIndex];
            thisIndex++;
        }
    }
}
```

The decompressed samples are transformed back to the time domain and the output signal is compared to the input signal.

The simulation verifies that the input SNR is the same as the output SNR when all 1023 frequency lines are preserved and the compression does not overlap noise bandwidth about each frequency.

CONCLUSION

Although the description of the present invention herein describes specific embodiments of the present invention, the scope of the present invention includes other embodiments of the present invention not described herein.

In summary, the present invention describes systems, methods and apparatuses for reducing or eliminating the auto-correlation or cross-correlation events that occur during weak signal conditions. The devices in accordance with the present invention also provide the ability to correct the auto- or cross-correlation event to allow the GPS receiver to lock onto the proper signal.

A method for compressing a Global Positioning System (GPS) signal in accordance with the present invention comprises removing a carrier component of the GPS signal, matching a comb filter to the GPS signal to obtain a first output comprising filter lines, and frequency shifting the filter lines in the first output to produce a compressed GPS signal.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. An apparatus for compressing a Global Positioning System (GPS) signal comprising:
   a first mixer for removing a carrier component of the GPS signal;
   a second mixer for receiving the carrier-removed GPS signal and a separately received frequency reference signal that is received at the apparatus separately from the GPS signal and outputting a resultant signal;
   a comb filter, coupled to the second mixer, for filtering the resultant signal and obtaining a first output comprising filter lines; and
   a frequency shifter for shifting the filter lines in the first output to produce a compressed GPS signal.

2. The apparatus of claim 1, further comprising a second frequency shifter for shifting the compressed GPS signal to produce a second compressed GPS signal.

3. The apparatus of claim 2, wherein the comb filter filters the carrier-removed GPS signal that has been combined with the reference frequency signal received from a remote location via a wireless communication link, and using the reference frequency signal from the remote location to shift the carrier-removed GPS signal received at the comb filter to an expected location of the filter lines of the first output.

4. The apparatus of claim 3, wherein the frequency shifting of the filter lines comprises mixing the filter lines with at least one output of a frequency generator.

5. A receiver comprising:
   at least one antenna for receiving a GPS signal from GPS satellites and for sending and receiving radio signals over a radio link to a base station, the radio signals including a frequency reference signal;
   a first mixer for removing a carrier component of the GPS signal;
   a second mixer for receiving the carrier-removed GPS signal and the frequency reference signal and outputting a resultant signal;
   a comb filter, coupled to the second mixer, for filtering the resultant signal and obtaining a first output comprising filter lines; and
   a frequency shifter for shifting the filter lines in the first output to produce a compressed GPS signal.

6. The receiver of claim 5 where the at least one antenna includes a GPS antenna for receiving the GPS signal and a wireless communications antenna for communicating the radio link.

7. The receiver of claim 5 further comprising:
   a transmitter coupled to the at least one antenna to communicate the compressed GPS signal to the base station.

8. The receiver of claim 5, further comprising a second frequency shifter for shifting the compressed GPS signal to produce a second compressed GPS signal.

9. The receiver of claim 8, wherein the comb filter filters the carrier-removed GPS signal that have been combined with the reference frequency signal received from a remote location via a wireless communication link, and using the reference frequency signal from the remote location to shift the carrier-removed GPS signal received at the comb filter to an expected location of the filter lines of the first output.

10. The receiver of claim 9, wherein the frequency shifting of the filter lines comprises mixing the filter lines with at least one output of frequency generator.

* * * * *